Figure 1:
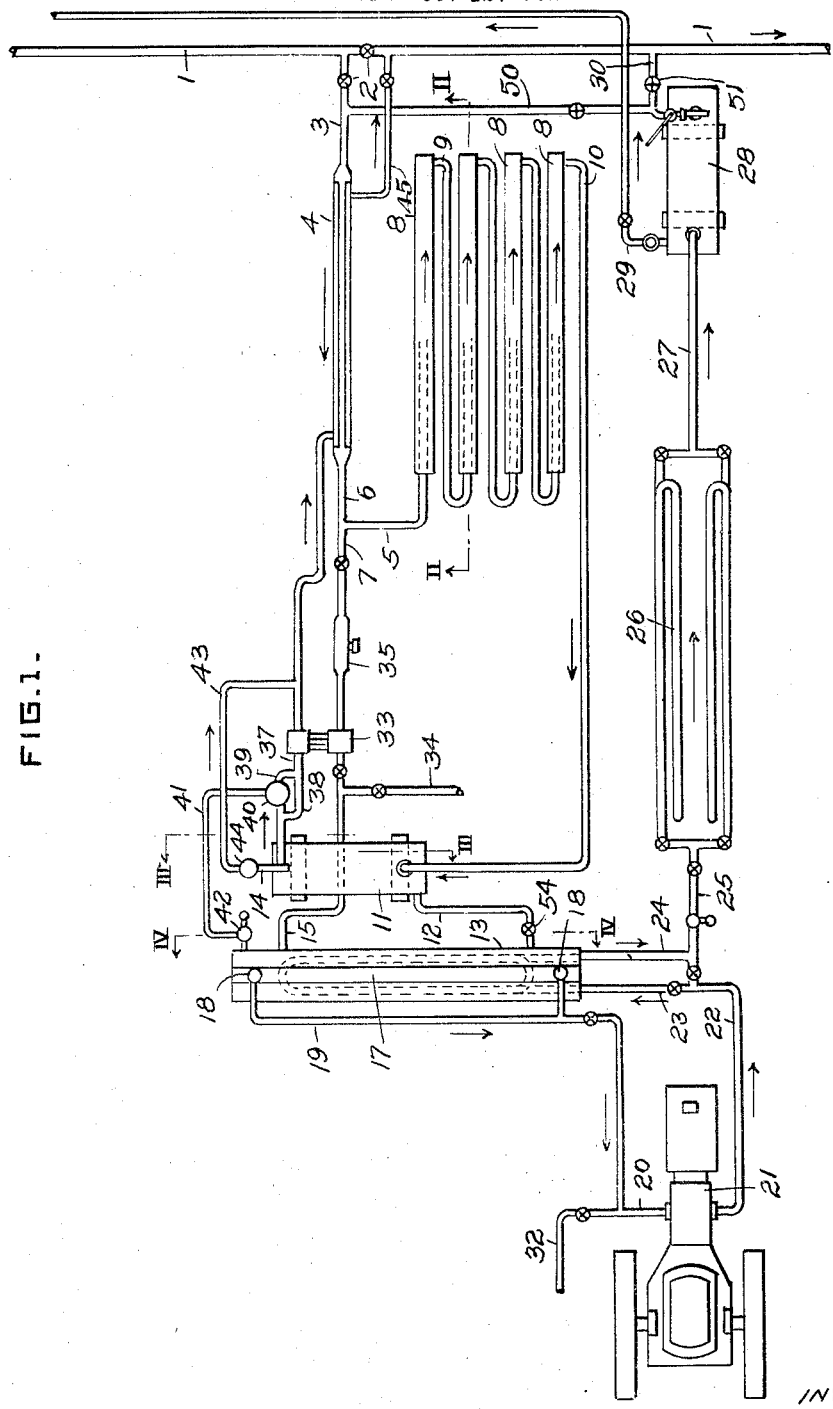

Dec. 15, 1925.

H. A. MOSSOR 1,565,749

RECOVERY OF GASOLINE FROM NATURAL GAS

Filed Dec. 12, 1922    3 Sheets-Sheet 1

WITNESSES
J. Herbert Bradley.

INVENTOR
Homer A. Mossor,
by Winter & Brown,
his Attorneys.

Dec. 15 1925.                              1,565,749
H. A. MOSSOR
RECOVERY OF GASOLINE FROM NATURAL GAS
Filed Dec. 12, 1922          3 Sheets-Sheet 2
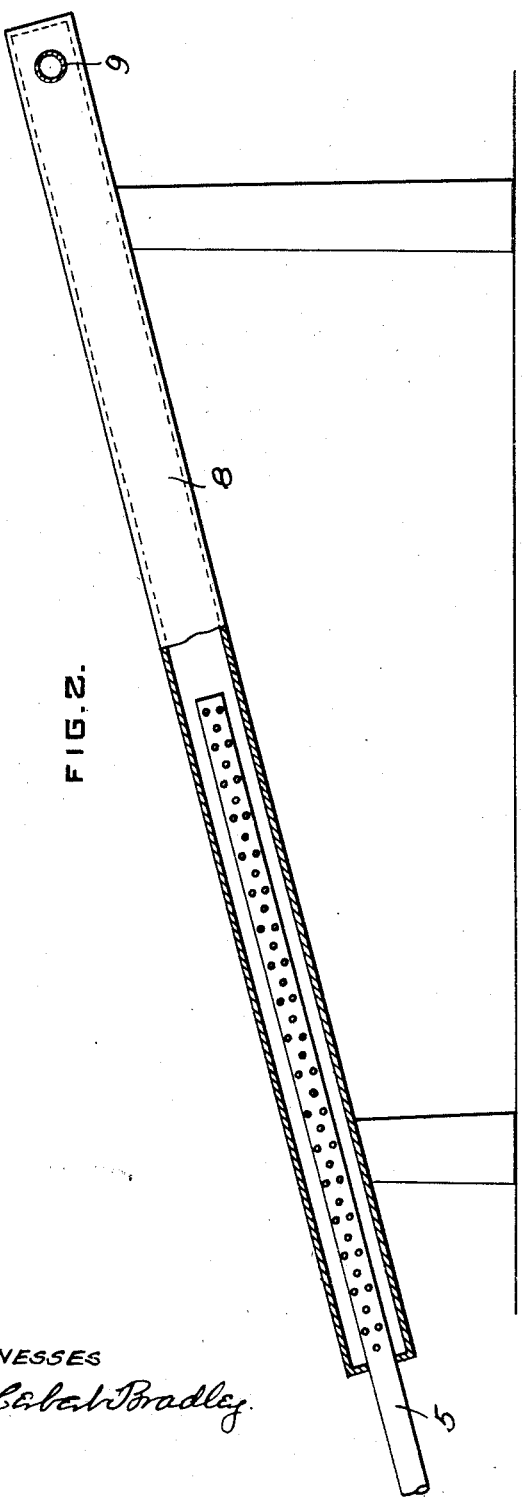
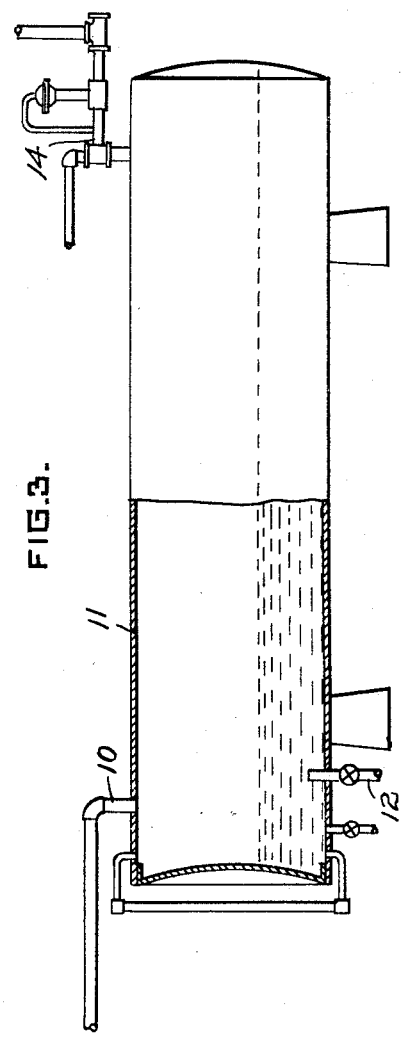
WITNESSES
INVENTOR Dec. 15, 1925.
H. A. MOSSOR
1,565,749
RECOVERY OF GASOLINE FROM NATURAL GAS
Filed Dec. 12, 1922     3 Sheets-Sheet 3
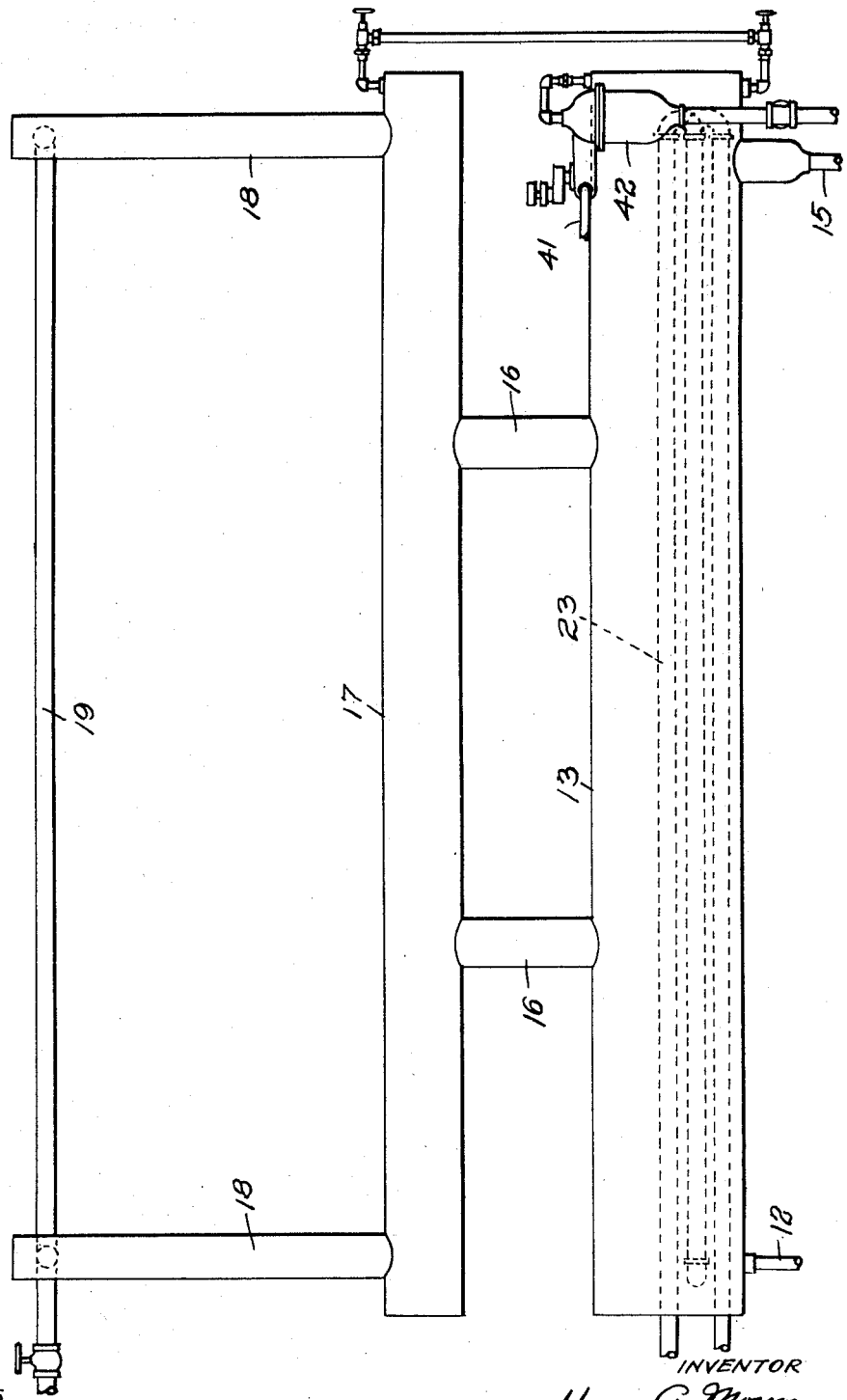

Patented Dec. 15, 1925.

1,565,749

UNITED STATES PATENT OFFICE.

HOMER A. MOSSOR, OF STOFFEL, WEST VIRGINIA, ASSIGNOR TO SOUTH PENN OIL COMPANY, OF PITTSBURGH, PENNSYLVANIA, A CORPORATION OF PENNSYLVANIA.

RECOVERY OF GASOLINE FROM NATURAL GAS.

Application filed December 12, 1922. Serial No. 606,371.

*To all whom it may concern:*

Be it known that I, HOMER A. MOSSOR, a citizen of the United States, and a resident of Stoffel, in the county of Kanawha and State of West Virginia, have invented a new and useful Improvement in Recovery of Gasoline from Natural Gas, of which the following is a specification.

The invention relates to processes for the recovery of gasoline from natural gas, and is applicable to both wet and dry natural gas, it being understood that wet gas is that which usually comes from a gas-producing oil well, and which contains a considerable amount of gasoline, and that dry gas is that which usually comes from a well producing only gas and which contains less gasoline than does wet gas.

The object of the invention is to improve the processes for the purpose explained to the end that gasoline may be effectively removed at a much reduced cost. A further object is to provide a process in which gasoline is so recovered by absorption in a menstruum that the usual alternate heating and cooling of the menstruum and the consequent expense thereof are avoided, and a process in which the expansive force of the gas is utilized for effecting economies in operation.

It is now well known that natural gas contains appreciable quantities of gasoline which may be recovered by compression and cooling and by absorption processes, the former usually being applied to wet and the latter to dry gas. As far as some features of the present invention are concerned, the improvements relate to a combined compression and cooling and absorption process, and, as far as concerns other features, it has to do with improvements in the absorption process alone.

In the practice of the invention natural gas containing gasoline, and preferably cooled to a suitable temperature, is subjected to an absorbing menstruum for the purpose of removing the gasoline constituents from the gas. During this step the gas is maintained at an elevated pressure, and provision is made for so intimately mixing the menstruum and gas that all the gas may be effectively brought into contact with the menstruum. While various menstruums may be used, it is preferred to employ a paraffin petroleum hydro-carbon, such as naphtha, having a Baumé gravity of from about 47 to 55°, and to so control the relative proportions of menstruum to the gas treated that the rise in gravity of the menstruum due to its absorption of constituents from the gas will not be greater than about 1° Baumé. By so doing, we have found that the menstruum readily yields its content of gasoline, and of such other constituents as it may have absorbed, by merely reducing the pressure on the menstruum and without subjecting it to heat.

After the absorption step, which may be effected in what is usually designated as an absorber, the gas, denuded of all or a large portion of its gasoline content, is separated from the menstruum. This may be effected in a separating vessel, or in any other desired way, and is preferably done under the same pressure as the absorption step. The charged menstruum is then conducted to a separator or still, in which the gasoline content of the menstruum is removed in vapor form, preferably by merely reducing the pressure upon the menstruum. Thereafter, the vapors separated from the menstruum are condensed either by compression and cooling or by either alone. If the absorption process is applied to natural gas which has previously been compressed and cooled to remove as liquid a portion of its gasoline content, the vapor separated from the menstruum may be mixed with gas before it is compressed and cooled with the result that the gasoline recovered by the compression and cooling is considerably in excess of that which it is possible to recover by the compression and cooling without mixing. In other words, by adding to wet gas before it is compressed and cooled the vapors resulting from the absorption step, less gasoline remains in the gas after its compression and cooling than if the gas had been compressed and cooled without the addition of the vapors resulting from the absorption step. In the practice of the invention the vapors recovered from the menstruum in the absorption step may, if desired, be separately condensed.

The menstruum is preferably used over and over again in a continuous cycle, it being caused to flow successively through the absorber, separator and still. For effecting the circulation of the menstruum, the expansive force of the denuded gas which is separated from the menstruum in the separator is preferably used for the motive power of a pump, and means are preferably provided for so regulating the rate of operation of the pump that the level of the menstruum in the still is automatically maintained substantially constant.

The invention may be more fully explained with reference to the accompanying drawings which illustrate improved apparatus on which it may be practiced. In the drawings Fig. 1 is a diagrammatic plan view of the preferred form and arrangement of the apparatus; Fig. 2 an elevation of one unit of the absorber, the plane of view being indicated by the line II—II, Fig. 1; Fig. 3 an elevation of the separator, the plane of view being indicated by the line III—III, Fig. 1; and Fig. 4 an elevation of the still, the plane of view being indicated by the line IV—IV, Fig. 1. In Figs. 2, 3 and 4 portions of the apparatus are broken away to show its interior.

Having reference to the drawings, gas from any suitable source flowing through a conduit 1 at an elevated pressure may be diverted from such conduit by closing a valve 2 and causing it to flow through a conduit 3, or gas from a particular source presently to be explained may be caused to flow through conduit 3 from a conduit 50. To reduce the temperature of the gas, in case it should be too warm to be effectively subjected to an absorbing menstruum, the gas may be first caused to flow through a cooler 4 in which it may be cooled by the expansion of previously denuded gas from the separator, the denuded gas being conducted to the cooler in a manner presently to be explained. The cooled gas is then brought into contact with the absorbing menstruum in a pipe 5, the gas flowing to such pipe through a pipe 6 and the menstruum flowing to it through a pipe 7. Intimate commingling of the gas and menstruum, and consequent effective absorption of gasoline constituents from the gas is effected in a scrubber or absorber comprising a series of inclined tubes 8. As seen particularly in Fig. 2, pipe 5 enters the lower end of the first tube 8 of the series and is provided within the tube with suitable perforations. From the upper end of each tube 8 the mixture of gas and menstruum flows through a pipe 9 to the lower end of the next tube 8, and so on throughout the entire series of tubular absorbers until the mixture of gas and menstruum finally flows through a pipe 10 leading to a separator 11 which is shown partly in section and partly in elevation in Fig. 3. The charged menstruum forms a pool in the bottom of the separator from which it is withdrawn through a pipe 12 leading to a still 13, and the denuded gas above the menstruum flows from the separator through a pipe 14 for utilization in the manner presently to be explained.

The still (Fig. 4) preferably comprises a cylindrical vessel 13 into which the charged menstruum flows through pipe 12 connected to one of its ends, and from which the menstruum, denuded of its absorbed constituents, flows through a pipe 15. Extending upwardly from the top of vessel 13 there are tubes 16 which connect the still to a horizontal tubular header 17 in which the vapors are collected free from the menstruum, and from which they flow through tubes 18 to a pipe 19. The treatment of the menstruum for the removal of the constituents absorbed by it is preferably effected merely by a reduction of pressure on it which may be accomplished by properly cracking a valve 54 in pipe 12, and by the operation of a compressor or vacuum pump connected to vapor pipe 19 in case it is desired to compress the vapors or to reduce the pressure on the menstruum below atmospheric.

Vapor line 19 leads to the inlet 20 of a compressor 21 which, as stated, may be operated as a vacuum pump to reduce the pressure in still 13 below atmospheric or to receive vapors at such other pressure as it may be desired to effect distillation of the menstruum. The compressed vapors are preferably conducted through a pipe 22 to a pipe 23 which is coiled several times in the bottom of still 13 so that the elevation of the temperature of the vapors effected by their compression may be imparted to the menstruum to facilitate the removal of its absorbed constituents and to compensate for the cooling of the menstruum incident to the removal of its absorbed constituents by reason of the reduction of pressure on it. The outlet of pipe 23 is connected to a pipe 24, which, in turn, is connected to a pipe 25 leading to a bank of cooling coils 26 by which the vapors are further cooled. The lower ends of coils 26 are connected to a pipe 27 leading to an accumulator tank 28 in which the condensate is separated from such gaseous constituents as may have been absorbed by the menstruum and which are too light to be condensed under the temperature and pressure of operation. The condensate which is largely gasoline may be removed from the accumulator tank through a pipe 29, and the uncondensed gases may flow from the accumulator through a pipe 30 to gas line 1 leading to points of consumption.

The vapors removed from the menstruum in still 13 may be separately condensed in the manner just explained, or they may be mixed with wet natural gas entering compressor 21 from a pipe 32 attached to the inlet 20 of the condenser, with the attending advantage previously explained and which will be presently shown more fully by a description of results obtained in actual operation. When the vapors are thus mixed with wet natural gas the uncondensed gas from the accumulator tank 28 is subjected to the absorbing menstruum. This may be done by closing a valve 51 in pipe 30, and causing the uncondensed gas to flow through pipe 50 into conduit 3.

Having reference now to the denuded gas separated from the charged menstruum in separator 11, the expansive force of this gas is preferably utilized to impel the menstruum in its cycle of travel through the absorber, separator and still; and the cooling effected by the expansion of this gas may be utilized to cool the incoming gas prior to its being brought into contact with the menstruum. The menstruum is removed from still 13 by a pump 33 having its inlet connected to menstruum outlet 15 attached to the still, and its outlet connected to pipe 7, which, as previously explained, is attached to pipe 5 leading to the first absorber unit. Additional menstruum may be added to the system through pipe 34 attached to pipe 15, and, if necessary, the menstruum may be caused to pass through a suitable filter 35 inserted in pipe 7.

Pump 33 is operated by the expansive force of the denuded gas which enters the pump through pipe 37. Means are preferably provided to so regulate the operation of pump 33 that the liquid in still 13 may be maintained at a substantially constant level. For this purpose two pipes are provided for connecting the pump inlet 37 to gas outlet 14 of the separator, one being pipe 38 through which gas continually flows to keep a certain amount of the menstruum in continuous circulation, and the other being a pipe 39 in which there is arranged a regulator 40 attached by a pressure line 41 to a float regulator 42 connected to still 13. By means of well known units of apparatus thus indicated, the flow of gas through pipe 39 may be varied depending upon the level of menstruum in still 13 so that the rate of operation of pump 33 may be automatically varied to maintain the menstruum at a substantially constant level.

The expanded cooled gas leading from pump 33 is preferably mingled with the remainder of the denuded gas which flows through a pipe 43 leading from a pressure reducing regulator 44 connected to the separator gas outlet pipe 14. The denuded gas, cooled by the reduction of its pressure, is caused to flow through cooler 4 counter-current to the incoming gas from line 1, and is discharged through a pipe 45 connected to pipe 1 beyond valve 2.

As an example of the actual practice of the invention, it has been used in connection with the plant for recovering gasoline from wet gas by the compression and cooling process. By the compression and cooling process alone an average of about 1,000 gallons of gasoline per day was recovered from approximately 800,000 cubic feet of gas a day compressed to 250 lbs. per square inch. After the gas had been compressed and cooled and its gasoline condensate removed from it, the gas was passed through the absorption system explained above with the result that approximately 700 gallons of gasoline was recovered in addition to the 1,000 gallons recovered by compression and cooling alone. The gas was subjected to the absorbing menstruum under a pressure of about 250 lbs., and the absorbed gasoline constituents were removed from the menstruum by reducing the pressure on the menstruum in the still to about 5 lbs. per square inch. The vapors removed from the menstruum were mixed with the incoming wet gas and compressed and cooled with it. The reduction is pressure of the denuded gas for the operation of the pump used for circulating the menstruum and for the cooling of the incoming gas about 175 lbs., so that the gas discharged into the pipe line was under sufficiently high pressure for transportation. The menstruum used for absorbing the gasoline constituents from the gas was naphtha having a Baumé gravity of about 50°.

However, the invention is not limited to the pressures stated, nor, in its broader aspects, to the particular kind of menstruum used. The pressure of the gas being treated may vary from 10 to 300 lbs., and in the still the pressure may be reduced to from a 28 inch vacuum to about 20 lbs. per square inch, although preferably the pressure of distillation varies from about a 5 inch vacuum to about a 5 lb. pressure per square inch.

The temperature of the menstruum, which it will be understood preferably does not vary throughout its cycle of travel, may range from 50° to 125° F., although the preferred range is from 65° to 90° F. The temperature of the gas being treated may vary from 20° to 100° F., although it is preferred to maintain its temperature at from 40° to 70° F.

The invention may be practiced for the recovery of gasoline alone, or for the recovery of gasoline and lighter constituents of the gas such as propane and butane which are industrially useful in the form of liquefied gas. When it is desired to recover these lighter constituents from the gas, the gas being treated is preferably subjected to a pressure of from about 250 to 500 lbs. per square inch. This will result in a greater amount of the lighter constituents being absorbed by the menstruum. The gasoline and lighter constituents may be simultaneously removed from the menstruum in the still 13 and subsequently compressed and cooled at such temperature and pressure as is necessary to liquefy substantially all the gasoline and butane and some propane. Subsequent to such liquefaction the lighter constituents may be separated from the gasoline by distillation which may be effected merely by reducing pressure upon the liquid.

As a further variation in the manner of practicing the invention, the temperature of distillation may be raised to about 90° F. with the result that a portion of the naphtha used as the absorbing menstruum will be distilled and pass off with the gasoline and other absorbed constituents. The naphtha thus distilled is subsequently condensed with the gasoline vapors and forms a commercial blend. The temperature of distillation may be controlled by regulating the amount of compression upon the vapors and their flow through pipe 23, all or any desired portion of the vapors heated by compression being caused to flow through this pipe. When blending is thus effected, additional naphtha is continuously placed in the system through pipe 34 to compensate for that distilled.

According to the provisions of the patent statute, I have described the principle and operation of my invention together with the preferred manner of practicing it. However, I desire to have it understood that, within the scope of the appended claims, the invention may be practiced otherwise than that specifically shown and described herein.

I claim:

1. The process of recovering gasoline from natural gas, comprising removing gasoline constituents from the gas by subjecting it under an elevated pressure to an absorbing menstruum to remove the gasoline constituents from the gas, maintaining the increase in gravity of the menstruum due to its absorption of constituents from the gas at not more than 1° Baumé, and subsequently separating from the menstruum by reduction of pressure on it and without elevating its temperature the constituents previously absorbed by it.

2. The process of recovering gasoline from natural gas, comprising removing gasoline constituents from the gas by subjecting it under an elevated pressure to naphtha of from about 47° to 55° Baumé to remove the gasoline constituents from the gas, maintaining the increase in gravity of the menstruum due to its absorption of constituents from the gas at not more than about 1° Baumé, and subsequently separating from the naphtha by reduction of pressure on it and without elevating its temperature the constituents previously absorbed by it.

3. The process of recovering gasoline from natural gas, comprising removing gasoline constituents from the gas by subjecting it under an elevated pressure to naphtha of from about 47° to 55° Baumé to remove the gasoline constituents from the gas, maintaining the increase in gravity of the menstruum due to its absorption of constituents from the gas at not more than about 1° Baumé, subsequently separating from the naphtha by reduction of pressure on it and without elevating its temperature the constituents previously absorbed by it, and utilizing the expansive force of the denuded gas to impel the denuded naphtha into contact with undenuded gas for future absorption of constituents from it.

4. The process of removing gasoline from wet natural gas, comprising first compressing and cooling the gas to remove as a liquid a portion of the gasoline from it, then removing uncondensed gasoline from the compressed gas by subjecting the gas to an absorbing menstruum, separating the menstruum from the denuded gas, subsequently reducing the pressure upon the charged menstruum to remove from it as vapor its gasoline content, and mixing the vapor thus removed from the menstruum with wet natural gas before it is subjected to the compression and cooling step.

5. The process of recovering gasoline from wet natural gas, comprising first compressing and cooling the gas to remove as a liquid a portion of the gasoline from it, then removing uncondensed gasoline from the compressed gas by subjecting the compressed gas to naphtha of from about 47° to 55° Baumé gravity, maintaining the increase in the gravity of the naphtha due to its absorption of constituents from the gas at not more than about 1° Baumé, separating the naphtha from the denuded gas, subsequently without elevating its temperature reducing the pressure upon the charged naphtha to remove from it as vapor its gasoline content, and mixing the vapor thus removed from the menstruum with wet natural gas before it is subjected to the compression and cooling step.

6. The process of recovering gasoline from natural gas, comprising removing gasoline constituents from the gas by subjecting it under an elevated pressure to an absorbing menstruum, separating the menstruum from the denuded gas, subsequently separating from the menstruum by reduction of pressure on it the vapor constituents previously absorbed by the menstruum, compressing the vapors thus separated from the menstruum, and preventing a reduction in the temperature of the menstruum by affecting an inter-change of heat between the compressed vapors and the menstruum while vapors are being removed from the menstruum.

7. The process of recovering gasoline from natural gas, comprising removing gasoline constituents from the gas by subjecting it under an elevated pressure to naphtha of from about 47° to 55° Baumé gravity, maintaining the increase in the gravity of the naphtha due to its absorption of constituents from the gas at not more than about 1° Baumé, separating the naptha from the denuded gas, subsequently separating from the charged naphtha by reduction of pressure on it the vapor constituents previously absorbed by it, compressing the vapors thus separated from the naphtha, and effecting an inter-change of heat between the compressed vapors and the naphtha while vapors are being removed from the naphtha.

8. The process of recovering gasoline from natural gas, comprising removing gasoline constituents from the gas by subjecting it under an elevated pressure to an absorbing menstruum to remove the gasoline constituents from the gas, maintaining the increase in gravity of the menstruum due to its absorption of constituents from the gas at not more than 1° Baumé, subsequently separating from the menstruum by reduction of pressure on it and without elevating its temperature the constituents previously absorbed by it, and utilizing the expansive force of the denuded gas to impel the denuded menstruum into contact with undenuded gas for future absorption of constituents from it.

In testimony whereof, I sign my name.

HOMER A. MOSSOR.